July 7, 1925.  1,545,114
J. A. ALVEY
CONVEYER
Filed March 29, 1922
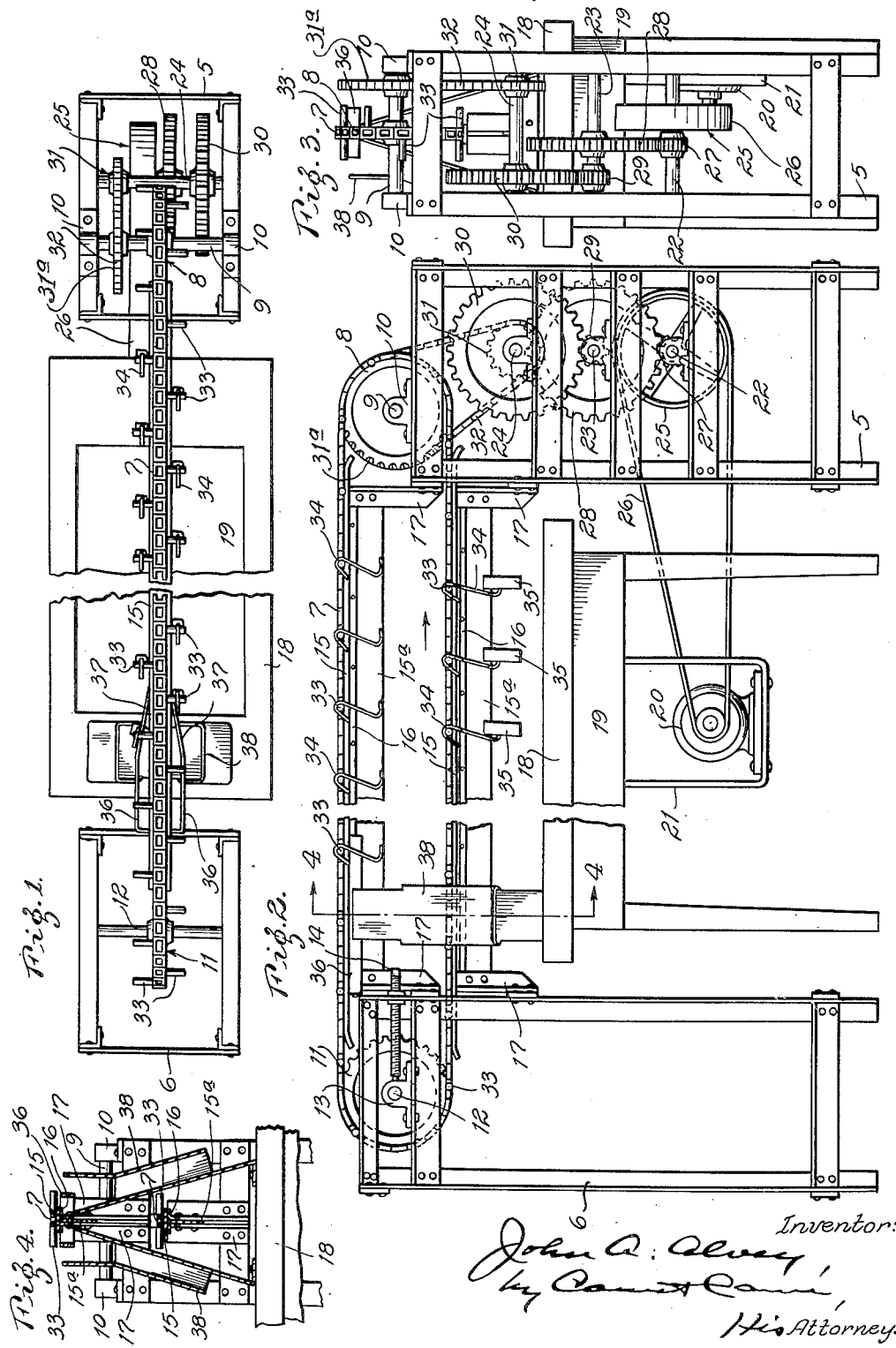
Inventor:
John A. Alvey,
by Cann & Cann,
His Attorneys Patented July 7, 1925.

1,545,114

UNITED STATES PATENT OFFICE.

JOHN A. ALVEY, OF ST. LOUIS, MISSOURI, ASSIGNOR TO ALVEY MANUFACTURING COMPANY, OF ST. LOUIS, MISSOURI.

CONVEYER.

Application filed March 29, 1922. Serial No. 547,629.

*To all whom it may concern:*

Be it known that I, JOHN A. ALVEY, a citizen of the United States, and a resident of the city of St. Louis and State of Missouri, have invented a new and useful Improvement in Conveyers, of which the following is a specification.

This invention relates to conveyers for handling and conveying articles that have been immersed in a coating material and has for its principal object to provide the conveyer with detachable article holders which constitute means for plunging the articles into a bath of coating material and hangers for suspending the coated articles from the conveyer in a position that will facilitate drying or hardening of the coating material during the conveying operation. Another object of my invention is to provide means for automatically stripping the article holders from the conveyer. Other objects are simplicity of operation, cheapness of construction and compactness of design. The invention consists in the arrangements and combinations of parts hereinafter described and claimed.

In the accompanying drawing, which forms part of this specification and wherein like symbols refer to like parts wherever they occur, Fig. 1 is a plan view of a conveyer embodying my invention, a work table having a basin for the coating material being shown in connection with said conveyer;

Fig. 2 is a side elevation of the conveyer and work table shown in Fig. 1;

Fig. 3 is an end elevation thereof; and

Fig. 4 is a vertical cross-section through the inclined chutes which deliver the article holders to the work table.

The conveyer shown in the accompanying drawing comprises two horizontally spaced upright end-frames 5 and 6. Each endframe consists of four upright angles arranged in the form of a rectangle and connected by horizontally cross members in the form of plates and angles. Extending horizontally between the upright end-frames 5 and 6 is an endless conveyer chain 7, one end of which is supported on a drive sprocket 8 fixed to a horizontal shaft 9 journaled in bearings 10 fixed to the top of the endframe 5; and the other end of said conveyer chain passes around an idler-sprocket 11 fixed to a shaft 12 journaled in bearings 13 secured to the top of the end-frame 6. The bearings for the idler-sprocket shaft 12 are equipped with suitable take-up stems 14 for tightening the endless conveyer chain to take up slack therein. The upper and lower stretches of the endless conveyer chain are supported between the sprocket wheels 8 and 11 on horizontally extending supporting plates 15 which extend from end-frame to end-frame. These plates are rigidly secured to tie-bars 15ª by means of angle irons 16. The tie-bars 15ª have their ends rigidly secured to the end-frames 5 and 6 by means of angles 17 and thus constitute means for connecting together the spaced end-frames as well as supports for the chain supporting plates 15.

Arranged between the end-frames 5 and 6, directly below the upper and lower stretches of the endless conveyer chain, is a work table 18 having a suitable receptacle or basin 19 formed therein adapted to contain a suitable liquid coating material. The conveyer chain is driven by means of an electric motor 20 supported in a hanger 21 depending from the underside of the work table 18. Journaled in horizontal bearings secured to the horizontal cross members of the end-frame 5 are vertically alined shafts 22, 23 and 24, which shafts are provided with suitable reduction gearing for transmitting motion from the electric motor 20 to the forward drive sprocket 8 for the conveyer chain 7. The lowermost shaft 22 is provided with a pulley 25, which is driven from the drive pulley of the electric motor by means of a belt 26. The shaft 22 is also provided with a pinion 27 which meshes with a larger gear 28 on the intermediate shaft 23. The intermediate shaft 23 is also provided with a pinion 29 which meshes with a larger gear 30 on the uppermost shaft 24. The uppermost shaft 24 is also provided with a sprocket wheel 31 which is connected by a sprocket chain 32 to a sprocket wheel 31ª fixed to the drive shaft of the conveyer. This arrangement of drive gearing permits the conveyer chain 7 to be driven from the electric motor 20 at a greatly reduced speed, the lower stretch of the conveyer chain traveling from the endframe 6 towards the end-frame 5 and the upper stretch on said conveyer chain traveling in a reverse direction.

The conveyer chain 7 comprises a series of links, some of which are provided with horizontally projecting pins 33. The links having the pins 33 are equally spaced apart lengthwise of the chain and are arranged so that said pins project alternately on opposite sides thereof. The pins 33 of the conveyer chain are adapted to support article holders in the form of wire hooks 34 that are bent into substantially Z-shaped form. The rebent upper ends of the hooks 34 are adapted to be hooked over the laterally projecting pins of the conveyer chain and carried thereby. The bent lower ends of the hooks 34 are adapted to support the articles 35 during the dipping thereof into the coating material and while in transit on the conveyer chain. The articles are stuck on one end of the supporting hooks and then dipped into a bath of suitable liquid coating material contained in the dipping tank 33 formed in the work table 18. The hooks, with the coated article stuck thereon, are then hooked over the laterally projecting pins 33 on each side of the lower stretch of the conveyer chain near the rear end of the conveyer and are slowly carried towards the forward end thereof, during which time the coating will have hardened sufficiently to permit handling of the articles. Upon arrival at the forward end of the conveyer, the hooks together with the coated articles carried thereby are removed from the conveyer. The article is removed from the detached hook, which is then attached to either the forwardly moving lower stretch of the conveyer chain or the rearwardly moving upper stretch of said conveyer chain. In either event, the replaced hooks are carried by the conveyer to the rear end of the work table.

Upon reaching the rear end of the work table, the empty hooks are automatically stripped from the pins on both sides of the conveyer chain by means of suitable stripping devices. The stripping devices comprise a pair of flat stripper plates 36 arranged one on each side of the conveyer chain below the rearwardly moving stretch thereof and provided with inwardly inclined portions 37 adapted to engage the body portions of the rearwardly moving hooks to deflect or crowd said hooks and gradually force the same off the outer ends of the supporting pins therefor. Suitable inclined chutes 38 are located beneath said stripper plates for receiving the hooks that are stripped off the pins for delivering said hooks to the work table within easy reach of the dipping operator who places the uncoated articles thereon, dips them into the coating material and then attaches the hooks to the forwardly moving lower stretch of the conveyer chain.

The hereinbefore described arrangement is particularly adapted for use in handling and conveying articles in the form of bars of frozen confection that are dipped in an edible coating material, but I do not wish to be limited thereto as the particular coating material is immaterial as is also the article to which it is applied.

Obviously, my device admits of considerable modification without departing from the invention; therefore, I do not wish to be limited to the exact arrangement shown and described.

What I claim is:

1. A conveyer comprising an endless power-driven member having article impaling devices detachably supported thereon, said devices constituting means for immersing the articles in a coating material and for suspending the coated articles from said conveyer, and means for automatically stripping said impaling devices from said conveyer.

2. A conveyer comprising an endless power-driven member having article impaling devices detachably supported thereon, said devices constituting means for immersing the articles in a coating material and for suspending the coated articles from said conveyer, means for automatically stripping said impaling devices from said conveyer, and means associated with said stripping means for delivering said article impaling devices to the point of immersion for said articles.

3. A conveyer comprising an endless power-driven member having a series of longitudinally spaced supports projecting laterally therefrom, article holders detachably supported on said supports, said article holders constituting implements for holding said articles in a bath of coating material and for suspending the coated articles from said conveyer, and means for automatically stripping said article holder from said supports.

4. The combination with a work-table having a basin therein adapted to contain a suitable coating material of a conveyer comprising an endless power-driven member traveling across said work-table, article holders detachably supported on said conveyer, said article holders constituting implements for immersing the articles in the bath of coating material contained in the basin in said work-table and for suspending the coated articles from said conveyer, and means for stripping said article holders from said conveyer and delivering them to said work-table.

5. A conveyer comprising an endless power-driven member having article impaling devices detachably supported thereon, said devices constituting means for immersing the articles in a coating material and for suspending the coated articles from said conveyer, and means for automatically stripping said impaling devices from said conveyer, said means comprising inclined plates disposed in the path of said impaling devices.

6. The combination with a work-table having a basin therein adapted to contain a suitable coating material of a conveyer comprising an endless power-driven member traveling across said work-table article holders detachably supported on said conveyer, said article holders constituting implements for immersing the articles in the bath of coating material contained in the basin in said work-table and for suspending the coated articles from said conveyer, and means for stripping said article holders from said conveyer and delivering them to said work-table, said means comprising inclined plates disposed in the path of said article holders and chutes for receiving said article holders as they are stripped from the conveyer.

Signed at St. Louis, Missouri, this 25th day of March, 1922.

JOHN A. ALVEY.